(12) United States Patent
Takaki et al.

(10) Patent No.: US 7,856,642 B2
(45) Date of Patent: Dec. 21, 2010

(54) CHUCKING MECHANISM, BRUSHLESS MOTOR HAVING THE CHUCKING MECHANISM, AND DISK DRIVING APPARATUS HAVING THE BRUSHLESS MOTOR

(75) Inventors: Hitoshi Takaki, Kyoto (JP); Yusuke Iwai, Kyoto (JP); Tomoya Uchimura, Kyoto (JP); Satoru Kuramoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 677 days.

(21) Appl. No.: 11/781,000

(22) Filed: Jul. 20, 2007

(65) Prior Publication Data

US 2008/0189730 A1 Aug. 7, 2008

(30) Foreign Application Priority Data

Jul. 20, 2006 (JP) .............................. 2006-198805

(51) Int. Cl.
G11B 17/028 (2006.01)

(52) U.S. Cl. ..................................................... 720/707

(58) Field of Classification Search ................. 720/707, 720/706, 710, 709; 369/271.1, 270.1
See application file for complete search history.

(56) References Cited

U.S. PATENT DOCUMENTS

| | | | | |
|---|---|---|---|---|
| 6,041,033 A * | 3/2000 | Otsubo et al. ............... | 720/707 |
| 6,272,104 B1 * | 8/2001 | Liao et al. .................... | 720/709 |
| 6,757,238 B2 * | 6/2004 | Higuchi ....................... | 720/710 |
| 7,412,713 B2 * | 8/2008 | Oota ............................ | 720/707 |
| 7,480,927 B2 * | 1/2009 | Oota ............................ | 720/707 |
| 7,493,632 B2 * | 2/2009 | Oota ............................ | 720/707 |
| 2004/0216154 A1 * | 10/2004 | Kim et al. .................... | 720/707 |
| 2006/0206909 A1 * | 9/2006 | Kuse et al. ................... | 720/707 |

FOREIGN PATENT DOCUMENTS

| | | | |
|---|---|---|---|
| JP | 08335351 | * | 12/1996 |
| JP | 2002-260313 | * | 12/2002 |
| JP | 2005038465 A | | 2/2005 |
| JP | 2005251298 A | | 9/2005 |
| JP | 2005251299 A | | 9/2005 |
| JP | 2005251300 A | | 9/2005 |
| JP | 2005251301 A | | 9/2005 |
| JP | 2005251302 A | | 9/2005 |
| JP | 2005251303 A | | 9/2005 |
| JP | 2005251304 A | | 9/2005 |
| JP | 2005251305 A | | 9/2005 |
| JP | 2005251306 A | | 9/2005 |
| JP | 2006127758 A | | 5/2006 |
| JP | 2007059040 A | | 3/2007 |

* cited by examiner

*Primary Examiner*—Angel A. Castro
(74) *Attorney, Agent, or Firm*—Westerman, Hattori, Daniels & Adrian, LLP

(57) ABSTRACT

A tip portion of a claw member is, when the same is at a lowest position, axially above a bottom surface of an upper disk base of a multi-layered disk. By virtue of such configuration, the tip portion will not be caught between the upper disk base and a lower disk base of the multi-layered disk.

11 Claims, 12 Drawing Sheets

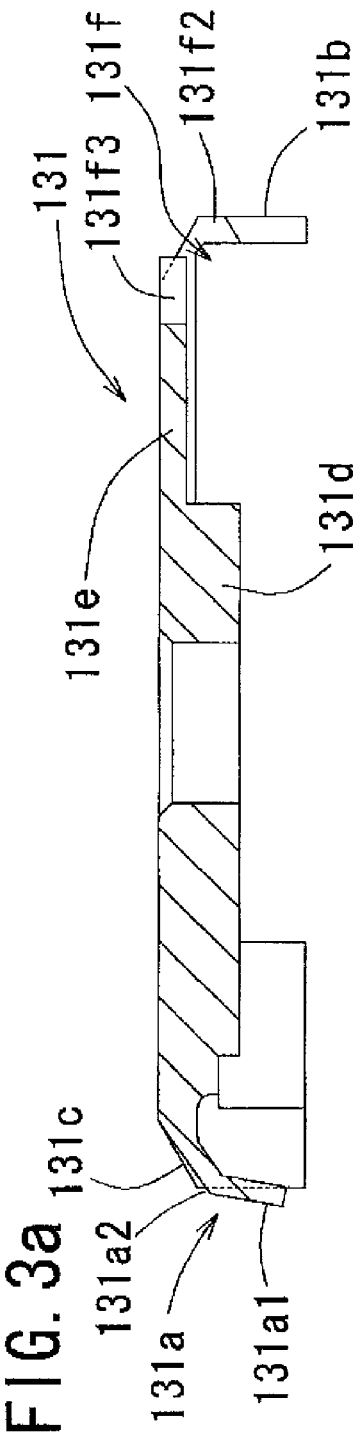
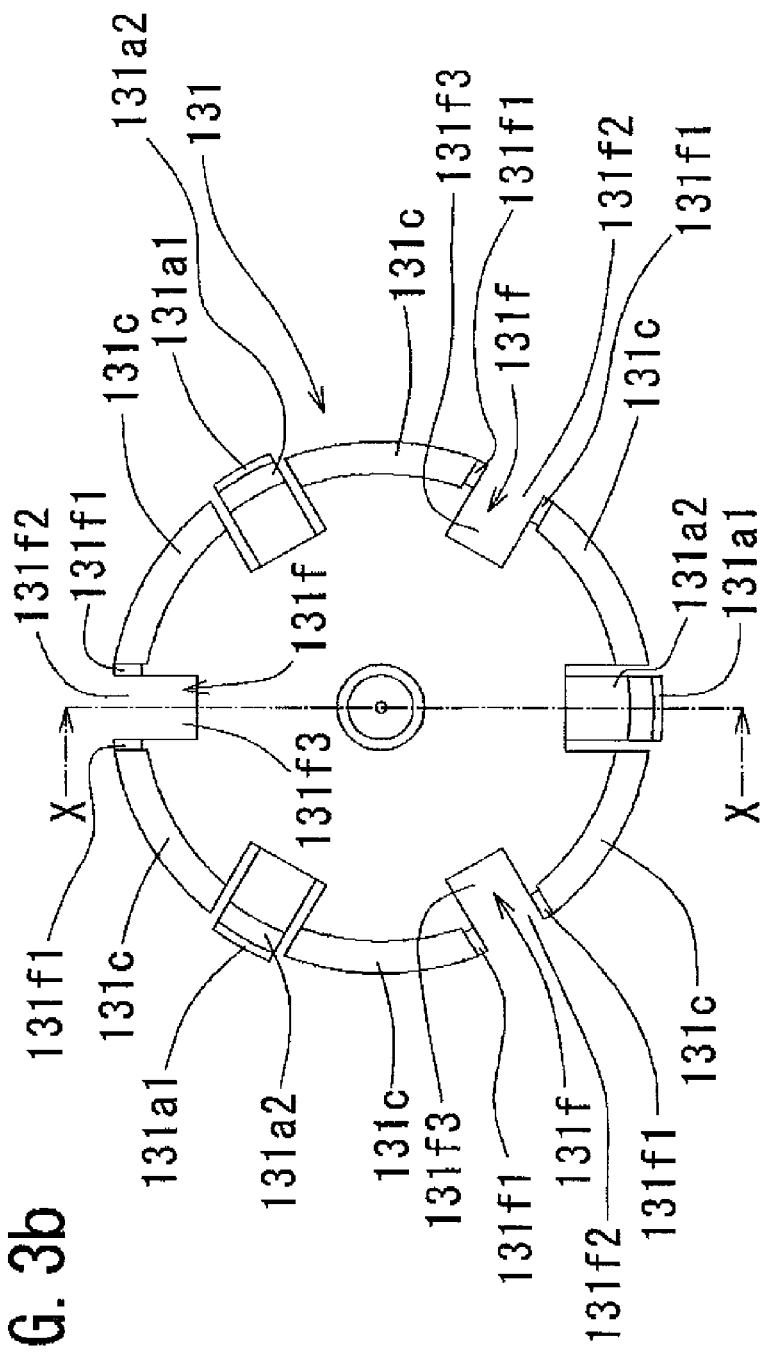

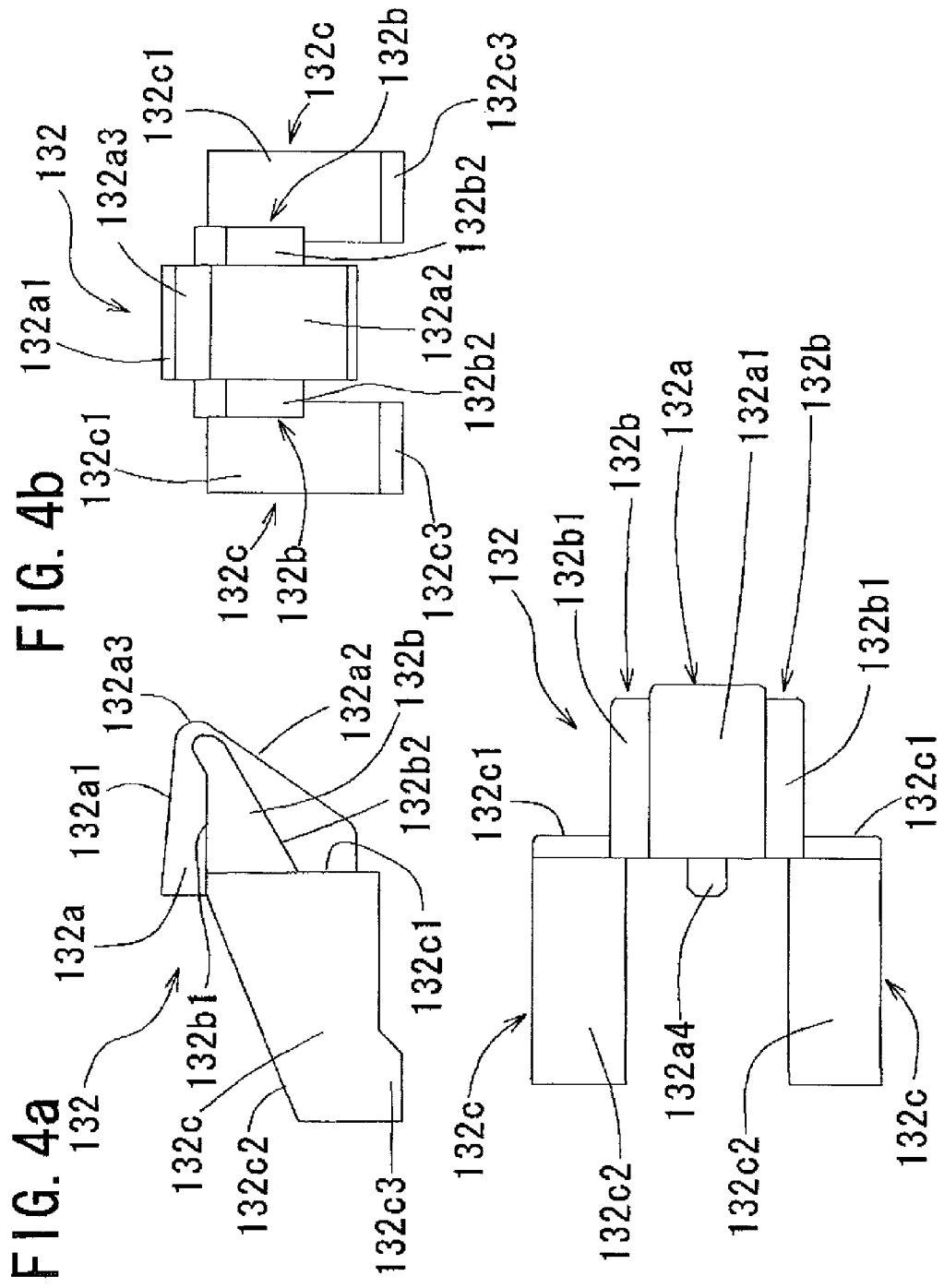

CHUCKING MECHANISM, BRUSHLESS MOTOR HAVING THE CHUCKING MECHANISM, AND DISK DRIVING APPARATUS HAVING THE BRUSHLESS MOTOR

BACKGROUND OF THE INVENTION

1. Field of the Invention

The present invention relates to a chucking mechanism used in a slim disk driving apparatus, and to a disk driving apparatus including a brushless motor including the chucking mechanism.

2. Description of Related Art

Conventionally, a disk having two disks pasted to one another by adhesive and a hole at a center thereof (hereafter, simply referred to as "multi-layered disk") has been used widely. Due to an increased demand for a slimmer disk driving apparatus, a method to retain the multi-layered disk has been changing from a clamping method in which the multi-layered disk is clamped to a method in which a chucking mechanism having a plurality of claw members supplying radial tension to the hole at the center of the multi-layered disk retains the multi-layered disk.

Hereinafter, a conventional chucking mechanism 1 will be described with reference to FIGS. 11 and 12. FIG. 11 is a schematic cross sectional view of the chucking mechanism 1 prior to retaining a multi-layered disk 2. FIG. 12 is a schematic cross sectional view of the chucking mechanism 1 in which a claw member 1b is at a radially innermost position.

According to FIG. 11, the chucking mechanism 1 preferably includes a center case 1a around which an inner edge of a central opening 2a of a multi-layered disk 2 (not shown in FIG. 11, see FIG. 12) will be arranged, a claw member 1b retaining the inner edge of the central opening 2a, an elastic member 1c providing radial force to the claw members 1b, and a turn table 1d having a mounting portion 1d1 on which the multi-layered disk 2 will be mounted. Also, the center case preferably includes at a portion thereof corresponding to the claw member 1b a protrusion 1a1 having a sliding surface 1a2 on which the claw members 1b slides.

It is to be appreciated that the adhesive may not be appropriately applied when forming the multi-layered disk 2, in particular at a portion near the central opening 2a, and therefore, a gap 2b may be formed when a force is applied to the central opening 2a. When the multi-layered disk 2 having such gap at the central opening 2a is placed on the chucking mechanism as described above, the multi-layered disk 2 will not be retained appropriately (see FIG. 12).

SUMMARY OF THE INVENTION

In order to overcome the problems described above, preferred embodiments of the present invention provide a chucking mechanism operable to detachably mount thereon a discoid disk including an upper disk base and a lower disk baser a brushless motor including the chucking mechanism, and a disk driving apparatus including the brushless motor. Note that the chucking mechanism is compatible with a disk having a single layer.

The chucking mechanism includes a center case, an elastic member arranged inside the center case, a plurality of claw members receiving a radial force from the elastic member, a turn table including a disk mounting portion on which a disk is mounted. The turn table rotates concentric with a rotary axis.

The claw member includes a tip portion which is radially an outermost portion thereof, moves in an axially downward direction, and moves radially inward when the disk is mounted on the chucking mechanism. The tip portion will be arranged, when the tip portion is at a lowest point in the axial direction, axially above a bottom surface of the upper disk when the disk is mounted. In particular, a distance between the tip portion and the top surface of the disk mounting portion will be preferably greater than approximately 1.08 mm.

Other features, elements, steps, characteristics and advantages of the present invention will become more apparent from the following detailed description of the preferred embodiments thereof with reference to the attached drawings.

BRIEF DESCRIPTION OF THE DRAWINGS

FIG. 3a is a schematic cross sectional view in the axial direction of a center case according to a preferred embodiment of the present invention.

FIG. 3b is a plan view of the center case according to the preferred embodiment of the present invention.

FIG. 4a is a schematic side view of a claw member according to a preferred embodiment of the present invention.

FIG. 4b is a schematic front view of the claw member according to the preferred embodiment of the present invention.

FIG. 4c is a plan view of the claw member claw member according to the preferred embodiment of the present invention.

DETAILED DESCRIPTION OF PREFERRED EMBODIMENTS

Structure of Brushless Motor

Figure 1:
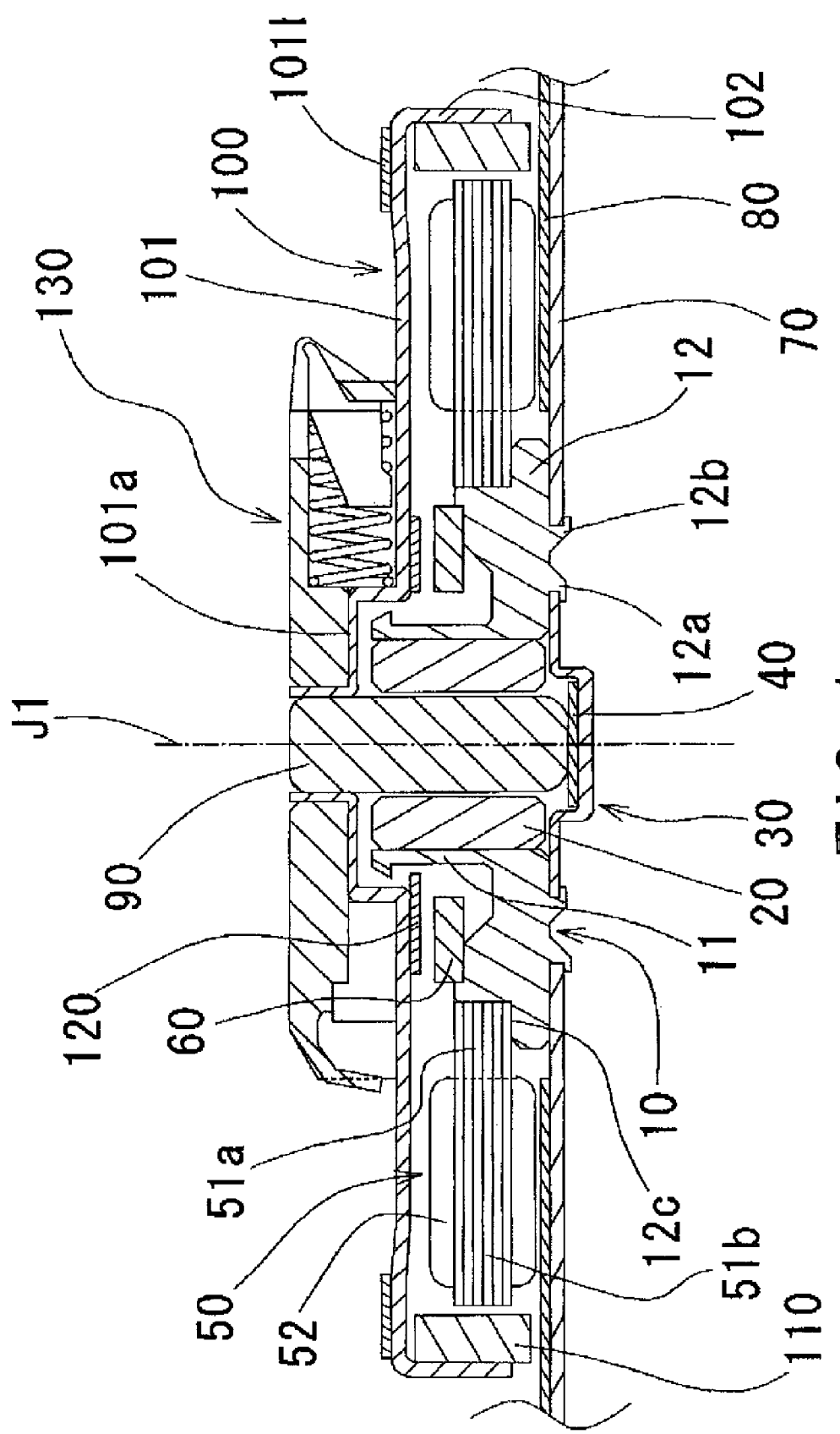
FIG. 1 is a schematic cross sectional view in an axial direction of a brushless motor according to a preferred embodiment of the present invention.

Hereinafter a brushless motor according to a preferred embodiment of the present invention will be described with reference to FIG. 1. FIG. 1 is a schematic cross sectional view in an axial direction of a brushless motor according to a preferred embodiment of the present invention. Note that in the description of the preferred embodiments of the present invention herein, words such as upper, lower, left, right, upward, downward, top, and bottom for describing positional relationships between respective member and directions merely indicate positional relationships and directions in the drawings. Such words do not indicate positional relationships and directions of the member mounted in an actual device. Also, note that the reference numerals, figure numbers and supplementary descriptions are shown below for assisting the reader in finding corresponding components in the description of the preferred embodiments below to facilitate the understanding of the present invention. It should be noted that these expressions in no way restrict the scope of the present invention.

Hereinafter, a stator portion of the brushless motor will be described.

A housing 10 preferably having a substantially cylindrical shape concentric with a rotary axis J1 is preferably made by a deformation process such as cutting performed on a copper base material. A sleeve 20 is affixed to an inner circumferential surface of a cylindrical portion of the housing 10. The sleeve 20 preferably having a substantially cylindrical shape is a sintered member impregnated with oil.

The housing 10 preferably includes at a portion axially below the cylindrical portion 11 a stator base portion 12 preferably having a substantially cylindrical shape extending radially outward, wherein the cylindrical portion 11 and the stator base portion 12 are preferably formed integrally. The stator base portion 12 preferably includes at a bottom portion thereof a protrusion extending radially inward and a protrusion extending radially outward (hereinafter, referred to as inner circumferential protrusion 12a and outer circumferential protrusion 12b, respectively). A plate 30 is arranged extending inwardly from the inner circumferential protrusion 12a. The plate 30 and the inner circumferential protrusion 12a are affixed to one another by calking. A thrust plate 40 preferably having a substantially disk shape preferably made of a material excellent in abrasion resistance quality is arranged axially above the plate 30.

The housing 10 preferably includes at an outer circumferential portion of the stator base portion 12 a stator mounting portion 12c for mounting thereon a stator 50 (described below). The stator 50 preferably includes a stator core 51 having a core back portion 51, a plurality of tooth portions 51b each extending radially outward of the core back portion 51a, and a plurality of coils 52 each formed by winding a plurality of times a conductive wire around each tooth portion 51b.

The housing 10 preferably includes at a portion radially inward of the stator 50 of the stator base portion 12 a pressuring magnet 60 preferably having a substantially annular shape. The pressuring magnet 60 is arranged such as to axially oppose a bottom surface of a lid portion 101 of a rotor holder 100 (described below).

An attachment board 70 is affixed by calking to the housing 10 at an outer circumferential surface of the outer circumferential protrusion 12b. A circuit board 80 for controlling a rotation of the brushless motor is arranged on a top surface of the attachment board 70. The stator 50 is preferably covered by the circuit board 80 and the attachment board 70.

Hereinafter, a rotor portion of the brushless motor will be described.

A shaft 90 is inserted in an inner circumferential surface of the sleeve 20 in a concentric manner with the rotary axis J1.

The shaft 90 is rotatably supported in a radial direction by the inner circumferential surface of the sleeve 20 while the same is supported in the axial direction by the thrust plate 40.

A rotor holder 100 preferably having an operculated and substantially cylindrical shape is affixed at an upper portion of the shaft 90 so as to cover the stator 50. The rotor holder 100 is preferably formed by pressing a magnetic steel plate. Also, the rotor holder 100 preferably includes a lid portion 101 and a cylindrical portion 102. The lid portion 101 preferably includes at a portion axially corresponding to the sleeve 20 and the cylindrical portion 11 a leveled portion 101a. By virtue of such configuration, the sleeve 20 can be extended in the axial direction. At a bottom surface of the leveled portion 101a a stopper member 120 for preventing the rotor holder 100 from being removed in the axial direction is arranged.

A rotor magnet 110 is arranged at an inner circumferential surface of the cylindrical portion 102. An inner circumferential surface of the rotor magnet 110 is opposed, via a gap in the radial direction, to an outer circumferential surface of the tooth portions 51b of the stator 50.

A center case 131 of a chucking mechanism 130 for detachably mounting thereon a disk (not shown in FIG. 1) is arranged on a top surface of the lid portion 101. A disk mounting portion 101b for mounting thereon the disk is arranged at an outer end of the lid portion 101. According to the present preferred embodiment of the present invention the rotor holder 100 functions as a turn table.

Chucking Mechanism

Figure 2:
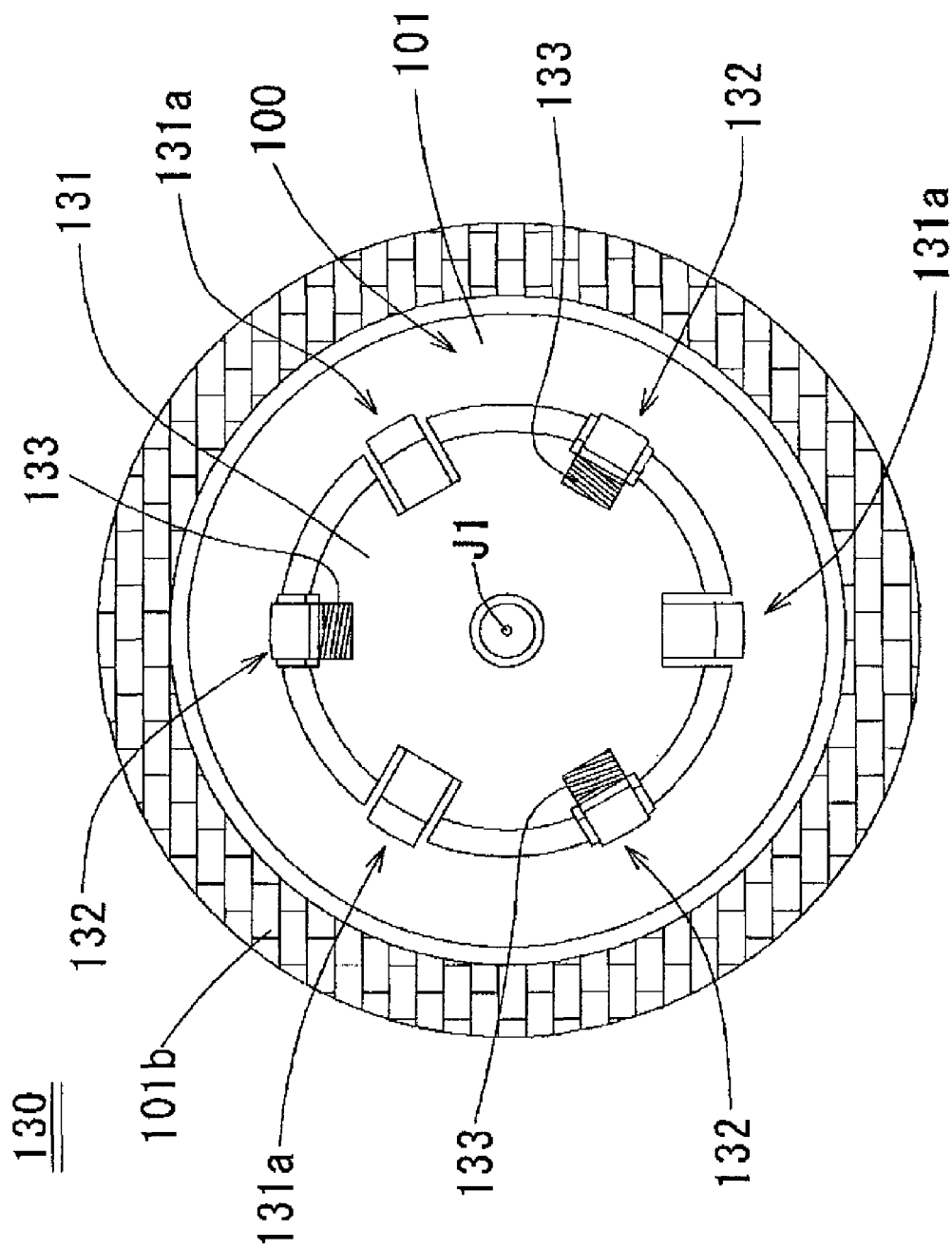
FIG. 2 is a plan view of a chucking device according to a preferred embodiment of the present invention.
Figure 5:
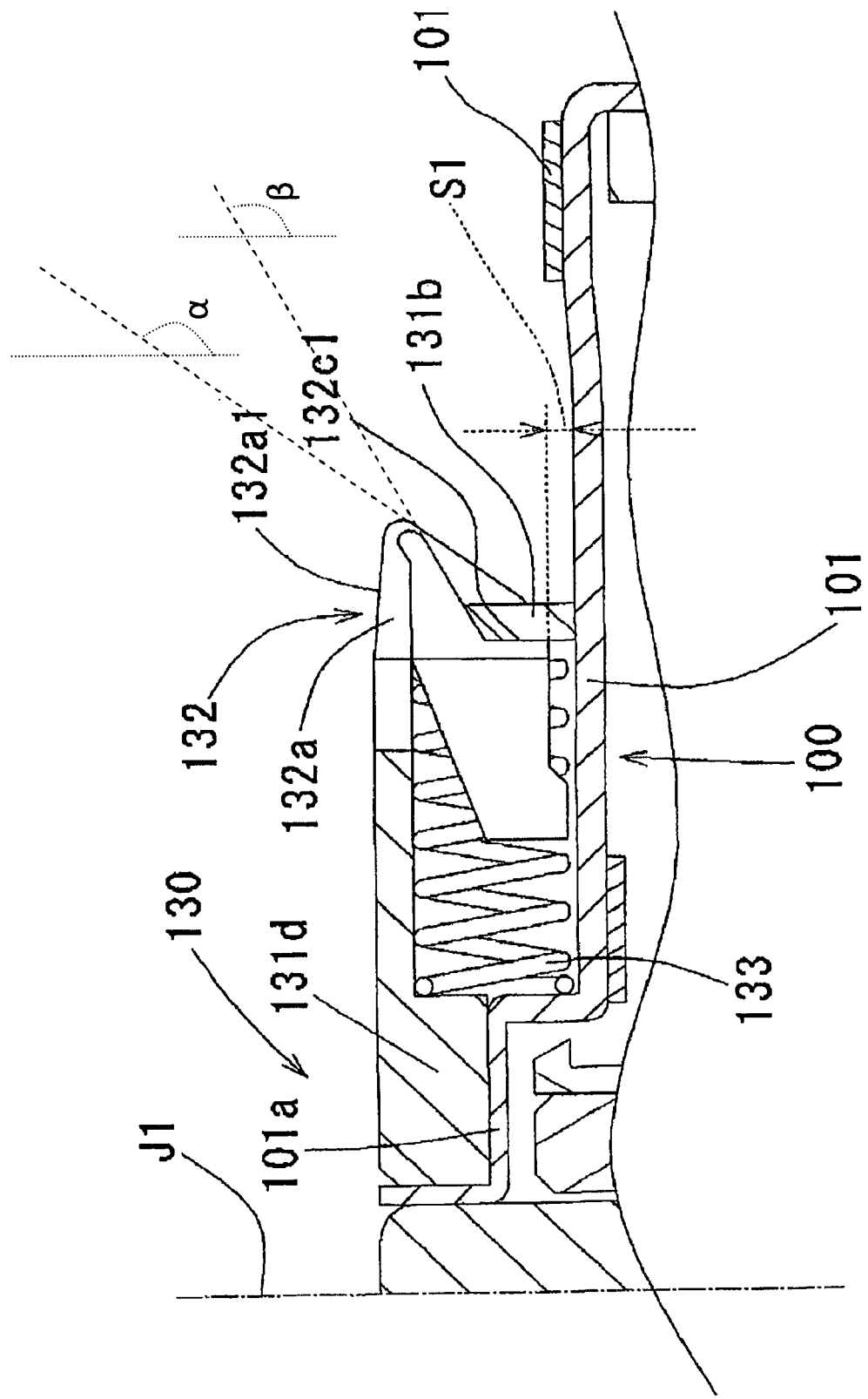
FIG. 5 is an enlarged schematic cross sectional view of the chucking mechanism before a multi-layered disk makes contact therewith.

Hereinafter, the chucking mechanism 130 according to a preferred embodiment of the present invention will be described with reference to FIGS. 2 through 5. FIG. 2 is a plan view of the chucking mechanism 130 according to the present preferred embodiment of the present invention. FIG. 3a is a schematic cross sectional view in the axial direction of the center case according to the present preferred embodiment of the present invention. FIG. 3b is a plan view of the center case 131 according to the present preferred embodiment of the present invention. FIG. 4a is a schematic side view of a claw member according to a preferred embodiment of the present invention. FIG. 4b is a schematic front view of a claw member 132 according to the present preferred embodiment of the present invention. FIG. 4c is a plan view of the claw member 132 according to the preferred embodiment of the present invention. FIG. 5 is an enlarged schematic cross sectional view of the chucking mechanism 130 according to a preferred embodiment of the present invention.

According to FIG. 2, the chucking mechanism 130 preferably includes the center case 131 preferably having a substantially cylindrical shape concentric with the rotary axis J1, and the rotor holder 100 (i.e., turn table) having the disk mounting portion 101b. The disk mounting portion 101b mounted on the rotor holder 100 is preferably made of a material excellent in coefficient of friction.

The center case 131 preferably includes at an outer circumference thereof a plurality of aligning claws 131a for aligning a central opening portion of the disk (not shown in FIG. 2) with the rotary axis J1, a plurality of claw members 132 arranged so as to contact with the inner circumferential surface of the central opening of the disk. To be more specific, according to the preferred embodiment of the present invention, the chucking mechanism 130 preferably includes three aligning claws 131a and claw members 132 each are alternately arranged in the circumferential direction evenly apart from one another. Also, the center case 131 preferably includes an elastic member 133 which provides radial force for each claw member 132.

According to FIGS. 3a and 3b, the center case 131 preferably includes a cylindrical portion 131b, a guiding portion 131c arranged axially above the cylindrical portion 131b for guiding the disk to the cylindrical portion 131b, a base portion 131d for connecting the center case 131 with the rotor holder 100, and a top plate 131e connecting the guiding portion 131c and the base portion 131d.

Also, the center case 131 preferably includes at a portion between the cylindrical portion 131b and the top plate 131e an opening 131f for each claw member 132. A circumferential width of the opening 131f is greater than a circumferential width of the claw member 132 including a pair of sliding claw portions 132b (described later), and smaller than a circumferential width of the claw member 132 including a pair of stopper portions 132c attached on circumferential sides of the claw members 132. Also, a receiving portion 131f1 on which the sliding claw portion 132b slides is arranged at an inner surface of the cylindrical portion 131b corresponding to each of the sliding claw portion 132b.

Each opening 131f preferably includes a pair of side opening portion 131f2 arranged on circumferential sides of the opening 131f, and an upper side opening portion 131f3 which is an opening continuously extending upward from the side opening portion 131f2. It is to be appreciated that a circumferential width of the pair of the side opening portion 131f2 is greater than the circumferential width of the claw member 132 including the pair of the sliding claw portions 132b, and smaller than the circumferential with of the claw member 132 including the pair of the stopper portions 132c. Also, a circumferential width of the upper side opening portion 131f3 is greater than a circumferential width of an upper portion in the axial direction of the claw member 132 including a pair of retaining claw portions 132a (described later), and smaller than the circumferential width of the claw member 132 including the pair of the sliding claw portions 132b.

The aligning claws 131a each preferably include an aligning surface 131a1 which contacts with the inner circumferential surface of the central opening portion of the disk, and a guiding inclined surface 131a2 guiding the disk to the aligning surface 131a1. The guiding inclined surface 131a2 is shaped such that a portion thereof arranged radially inward of the cylindrical portion 131b is axially lower than the guiding portion 131c. That is, the portion of the guiding inclined surface 131a2 arranged radially inward of the cylindrical portion 131b makes no contact with the disk. Therefore the guiding inclined surface 131a2 guides the disk at a portion thereof arranged radially outward of the cylindrical portion 131a.

According to FIG. 4, the claw members 132 each include the pair of retaining claw portion 132a retaining the disk, the sliding claw portion 132b arranged on either circumferential side of the retaining claw portion 132a sliding the claw member 132, and the stopper portion 132c restricting a radial movement of the claw member 132.

The retaining claw portions 132a each include at a top surface thereof a guiding surface 132a1 having an inclination wherein the further radially outward a portion thereof is the axially lower the portion is. Also, a disk retaining surface 132a2, which contacts with an upper end of the central opening portion of the disk and retains the disk, is arranged axially below the guiding surface 132a1. A tip portion 132a3 having a curved surface protruding outwardly is arranged at a portion connecting the guiding surface 132a1 and the disk retaining surface 132a2. Mirror polishing, which allows the disk to travel smoothly to the disk retaining surface 132a2, is applied on the guiding surface 132a1 and the disk retaining surface 132a2. By virtue of such configuration, the disk can be attached to and detached from the chucking mechanism effectively.

An inner protrusion 132a4 which protrudes radially inward so as to engage with the elastic member 133 is arranged at an inner circumferential surface of the retaining claw portion 132a.

The sliding claw portion 132b is arranged axially below the guiding surface 132a1. The sliding claw portion 132b preferably includes at the top surface thereof a contacting surface 132b1 which makes contact with the bottom surface of the top plate 131e of the center case 131. A sliding surface 132b2 which radially slides the claw member 132 in the radial direction is arranged axially below the contacting surface 132b1. Also, the mirror polishing is applied on the sliding surface 132b2.

The sliding surface 132b2 of the sliding claw portion 132b is arranged radially inward of and axially above the disk retaining surface 132a2.

The stopper portion 132c is arranged at the side of the sliding claw portion 132b opposite from the retaining claw portion 132a. The stopper portion 132c includes at the radially outermost surface thereof a movement restriction surface 132c1 which makes contact with the inner circumferential surface of the cylindrical portion 131b so as to restrict radial movement of the claw member 132. Also, the stopper portion 132c includes at a top surface thereof an inclined surface 132c2 wherein the further radially inward a portion thereof is the axially lower the portion is. A radially outermost portion of the inclined surface 132c2 is substantially the same as the radially outermost portion of the sliding claw portion 132b, and an axially uppermost portion of the inclined surface 132c2 is arranged substantially the same as the axially uppermost portion of the sliding claw portion 132b. Also, the stopper portion 132c includes at a bottom surface thereof at a radially inner area a protrusion 132c3.

Hereinafter, the chucking mechanism 130 without a disk mounted thereon will be described with reference to FIG. 5.

The elastic member 133 which provides a radial force to the claw member 132 is arranged at a radial space between the center case 131 and the claw member 132. Note that according to the present preferred embodiment of the present invention, the elastic member 133 is a coil spring.

The base portion 131d of the center case 131 makes contact with the top surface of the leveled portion of the rotor holder 100. It is to be appreciated that an external diameter of the base portion 131d and that of the leveled portion 101a are substantially the same. A radially innermost portion of the elastic member 133 makes contact with the outer circumferential surface of the base portion 131d and the outer circumferential surface of the leveled portion 101a. Also, the radially outermost portion of the elastic member 133 is engaged with the inner protrusion 132a4 and thereby making contact with the radially inner surface of the retaining claw portion 132a. Also, a radially inner surface of the sliding claw portion 132b extends substantially coplanarly from the radially inner surface of the retaining claw portion 132a.

The radial movement of the claw member 132, which is radially forced in the outward direction by the elastic member 133, is restricted when the movement restriction surface 132c1 of the stopper portion 132c makes contact with the inner circumferential surface of the cylindrical portion 131b.

Also, it is to be noted that there is no extra component in the axial space between the top surface of the lid portion 101 and the retaining claw portion 132a. That is, a space S1 which defines the axial space between said elements is minimized, whereby the chucking mechanism 130 is allowed to be thinner allowing the brushless motor having such chucking mechanism 130 to be thinner.

Movement of Claw Members

Figure 6:
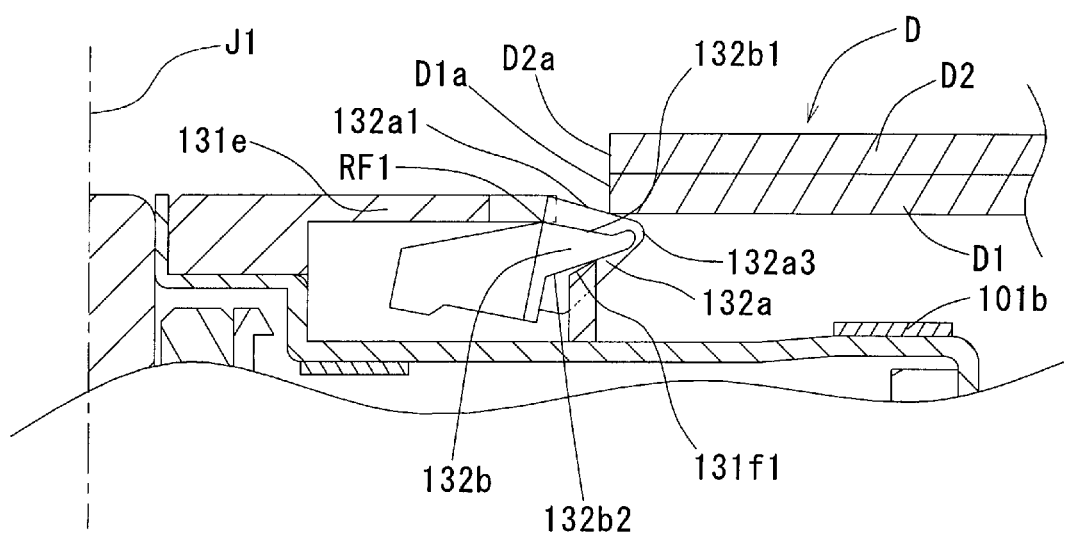
FIG. 6 is an enlarged schematic cross sectional view of the chucking mechanism when the multi-layered disk begins to make contact therewith.
Figure 7:
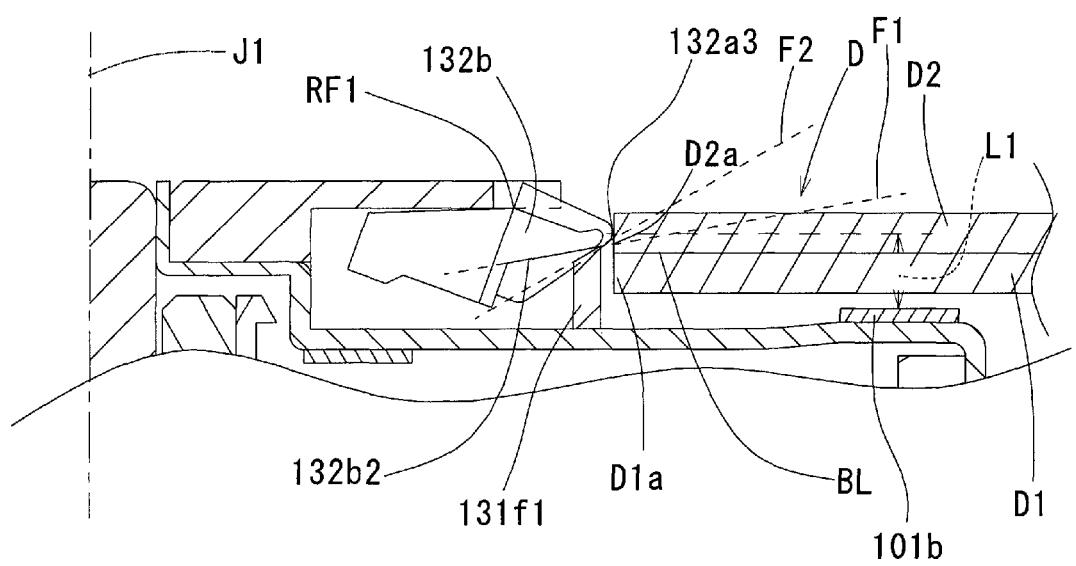
FIG. 7 is an enlarged schematic cross sectional view of the chucking mechanism when the claw member is moved radially inward.
Figure 8:
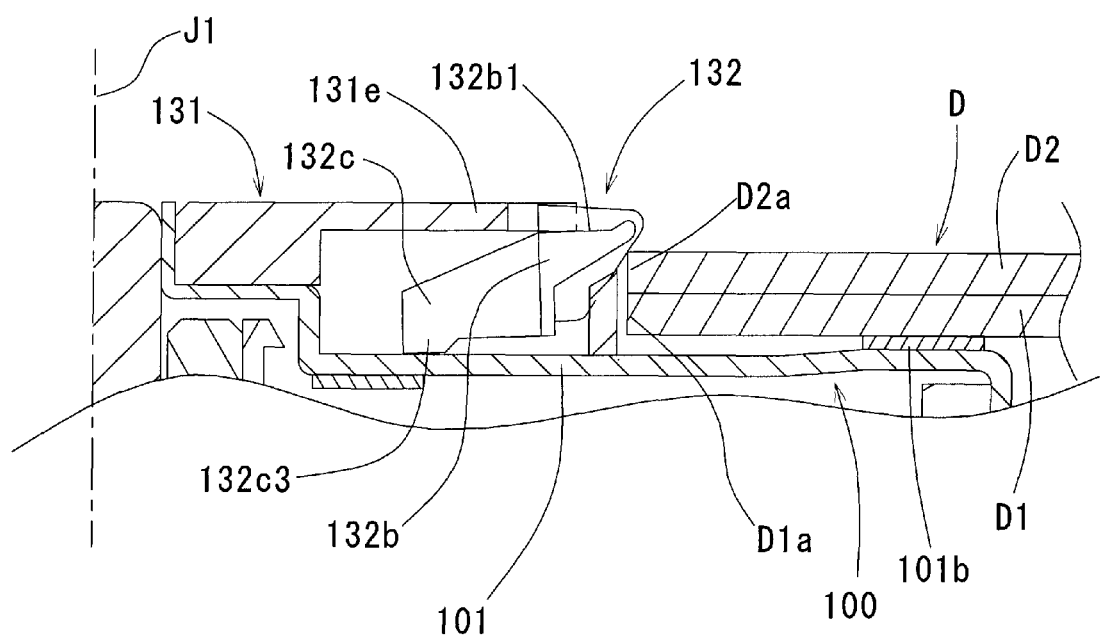
FIG. 8 is an enlarged schematic cross sectional view of the chucking mechanism when the multi-layered disk is mounted thereon.
Figure 9:
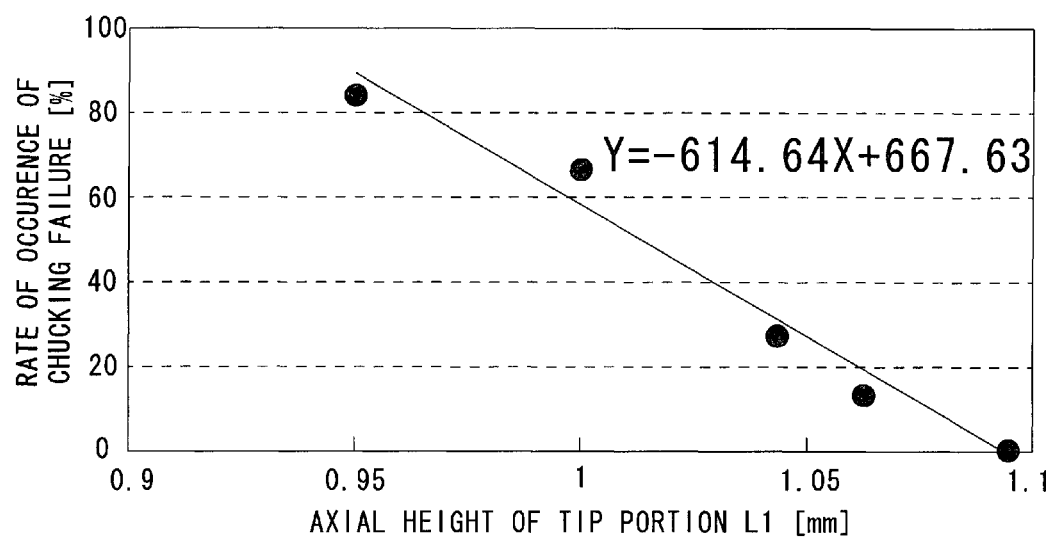
FIG. 9 is a graph indicating a correlation between a rate of occurrence of chucking failure and an axial height of a tip portion of the claw member according to the chucking mechanism of the preferred embodiment of the present invention.

Hereinafter, movement of the claw members 132 will be described with reference to FIGS. 6 through 9. FIG. 6 is an enlarged schematic cross sectional view of the chucking mechanism 130 when a disk D begins to make contact with the chucking mechanism 130. FIG. 7 is an enlarged schematic cross sectional view of the chucking mechanism 130 when the claw member 132 is moved radially inward. FIG. 8 is an enlarged schematic cross sectional view of the chucking mechanism 130 when the disk D is mounted thereon. It is to be appreciated that the hereafter, the disk D is a multi-layered disk. FIG. 9 is a graph indicating a correlation between a rate of occurrence of chucking failure and an axial height of the tip portion 132a3 of the claw member according to the chucking mechanism 130 of the present preferred embodiment of the present invention.

According to FIG. 6, when the disk D makes contact with the guiding surface 132a1 of the retaining claw portion 132a, the tip portion 132a3 of the retaining claw portion 132a is moved axially downward and radially inward.

Note that the disk D includes a lower disk base D1 and an upper disk base D2 which are pasted one another by adhesive and each of which have a central opening portion D1a and a central opening D2a.

Note that a supporting point RF1, which is a support point of the axial and radial movement of the tip portion 132a3 of the retaining claw portion 132a, is determined when a bottom surface of the top plate 131e makes contact with the top surface of the contacting surface 132b1 of the sliding claw portion 132b. That is to say, when the tip portion 132a3 is at an axially lowest point, a radially innermost portion of the contacting surface 132b1 makes contact with the bottom surface of the top plate 131e, and therefore, the radially innermost portion of the contacting surface 132b1 becomes the supporting point RF1. Note that when the tip portion 132a3 begins to move axially at the initial contact with the disk D, the support point RF1 is such that the contacting surface 132b1 makes contact with the top plate 131e. Since the contacting surface 132b1 makes contact with the top plate 131e which is arranged at an outer end of thereof, a radius of gyration R1 which is defined by the movement of the tip portion 132a3 and the supporting point RF1 is minimized. Therefore, a force required to mount the disk on the chucking mechanism is reduced.

The sliding claw portion 132b is forced radially inward when the same makes contact with the receiving portion 131f1 of the center case 131. That is to say that when a bottom end of the central opening portion D1a makes contact with the guiding surface 131a1, the sliding claw portion 132b makes contact with the receiving portion 131f1 whereby a component of a downward force which is generated when mounting the disk D on the chucking mechanism 130 is imparted from the receiving portion 131f1 to the sliding claw portion 132b forcing the sliding claw portion 132b so as to move radially inward.

According to FIG. 7, when the tip portion 132a3 makes contact with the central opening portion D2a of the upper side disk D2 (i.e., when the claw member 132 is at the radially innermost position), the supporting point RF1 will be further inwardly than the position of the supporting point RF1 as shown in FIG. 6. Also, the tip portion 132a3 will be at the axially lowest point. Also, at the same time, the sliding surface 132b2 makes contact with the receiving portion 131f1.

Also, according to FIG. 7, an axial height L1, which is an axial height of an outermost portion of the tip portion 132a3 when the said portion is at the lowest position in the axial direction from the top surface of the disk mounting portion 101b, is axially above than a borderline BL which is defined by a portion between the upper side disk D1 and the lower side disk D2. That is, the axial movement of the tip portion 132a3 will take place axially above the borderline BL. In particular, by virtue of such configuration which includes the receiving portion 131f1 and the sliding surface 132b2, when the outermost portion of the tip portion 132a3 is at L1 (i.e., the tip portion 132a3 is at the lowest position), the tip portion 132a3 is moved radially within the central opening portions D1a and D2a. Therefore, restriction will be, due to the receiving portion 131f1, imparted in axial position of the sliding surface 132b2 and thus imparted in the axial position of the tip portion 132a3.

Also, when the disk D is held at an outer end thereof in order to be mounted on the chucking mechanism 130, the borderline BL will be warped in the axial direction wherein a gap may be formed therein. In particular, in a case in which a multi-layered disk (e.g., Dual Disc) having a CD whose axial thickness is 0.9 mm and a DVD whose axial thickness is 0.6 mm is mounted while the CD side is below the DVD, L1 needs to be at least approximately 1.08 mm in order to avoid mal function of the chucking mechanism in which the tip portion 132a3 goes into the borderline BL.

Hereinafter, a correlation between a rate of occurrence of chucking failure and the axial height of the tip portion 132a3 will be described with reference to FIG. 9.

FIG. 9 is a graph indicating a correlation between the rate of occurrence of chucking failure and the axial height of the tip portion 132a3 of the chucking mechanism 130 according to the present preferred embodiment of the present invention. In particular, FIG. 9 indicates the occurrence of the malfunction of the chucking mechanism 130 when chucking the multi-layered disk 20 times with the CD side facing the disk mounting portion 101b while applying different values for L1. Note that the multi-layered disk includes two disks pasted to one another by adhesive wherein there are areas of the borderline BL no adhesive is applied. Also note that the vertical axis (Y) of the graph indicates the frequency (%) of the occurrence of the malfunction of the chucking mechanism 130 and the horizontal axis (X) indicates the value (mm) of L1.

According to FIG. 9, the greater the value of L1 is, the smaller the frequency of the occurrence of the malfunction of the chucking mechanism 130 becomes. When such relationship is numerically denoted, it is approximately: Y=−614.64X+667.63. That is, when Y is 0, no malfunction of the chucking mechanism occurs (i.e., when X equals approximately 1.08). Therefore, the value for L1 at which Y becomes 0 is the preferable value for L1. It is to be appreciated that the value X may change in accordance with the amount of adhesive used therein.

By virtue of the configuration described above, an angle defined by the disk guiding surface 132a1 and a surface that is perpendicular to the rotary axis J1 will become greater and therefore the disk D will be mounted on the chucking mechanism 130 smoothly.

According to FIG. 8, the claw member 132 retains the disk D wherein the disk retaining surface 132a2 makes, due to a radial force of the elastic member 133 forcing the claw member 132 outwardly, contact with an upper end of the central opening portion D2a. At this point, the contact is made between the radially outer side of the contacting surface 132b1 and the bottom surface of the top plate 131e. Then, the protrusion 132c3 of the stopper portion 132c makes contact with the top surface of the rotor holder 100. By virtue of such configuration, when removing the disk D off the chucking mechanism 130, the claw member 132 only moves radially inward, and therefore, the disk D will be removed smoothly.

Disk Driving Apparatus

Figure 10:
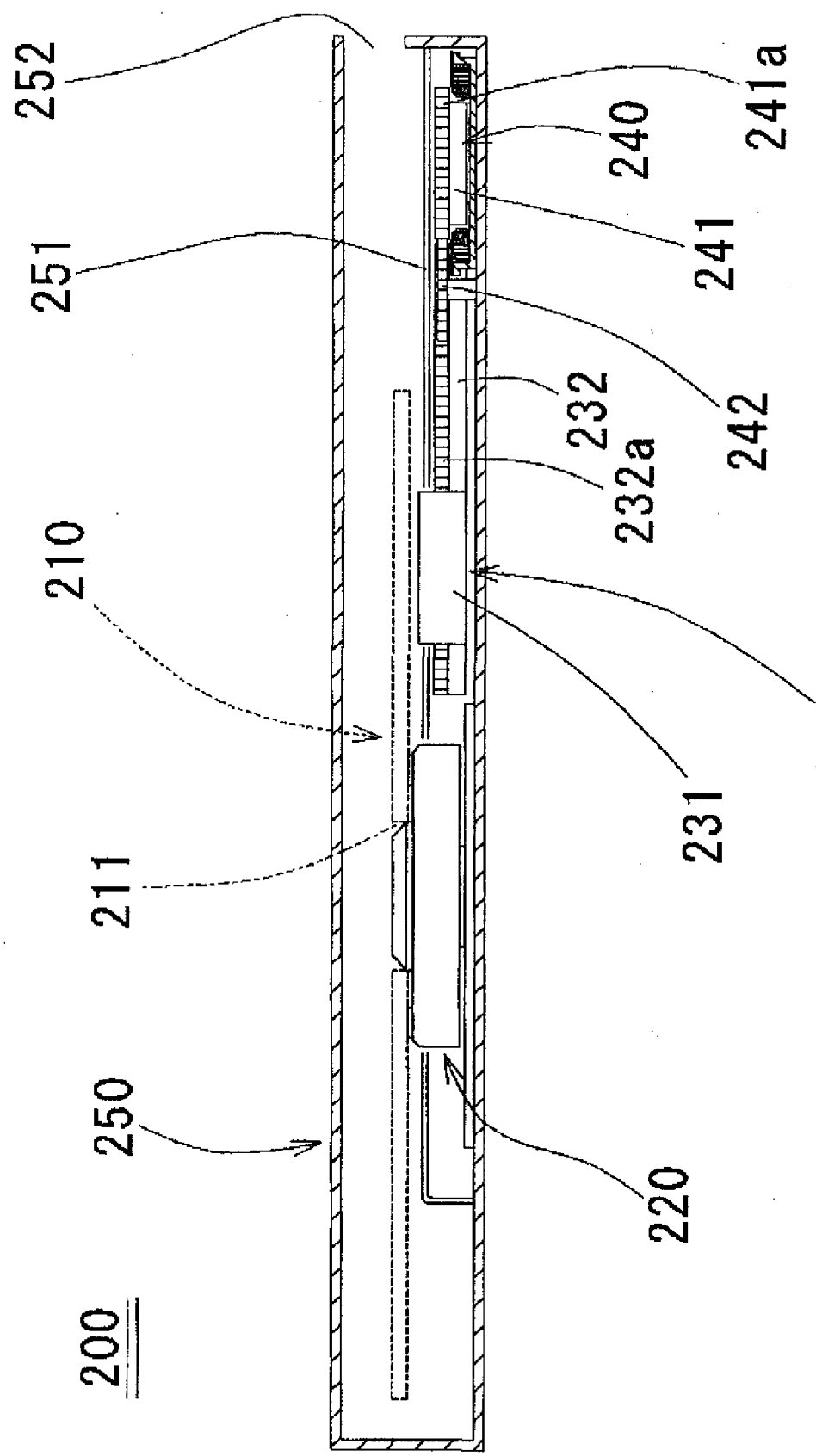
FIG. 10 is a schematic cross sectional view in the axial direction of a disk driving apparatus according to a preferred embodiment of the present invention.
Figure 11:
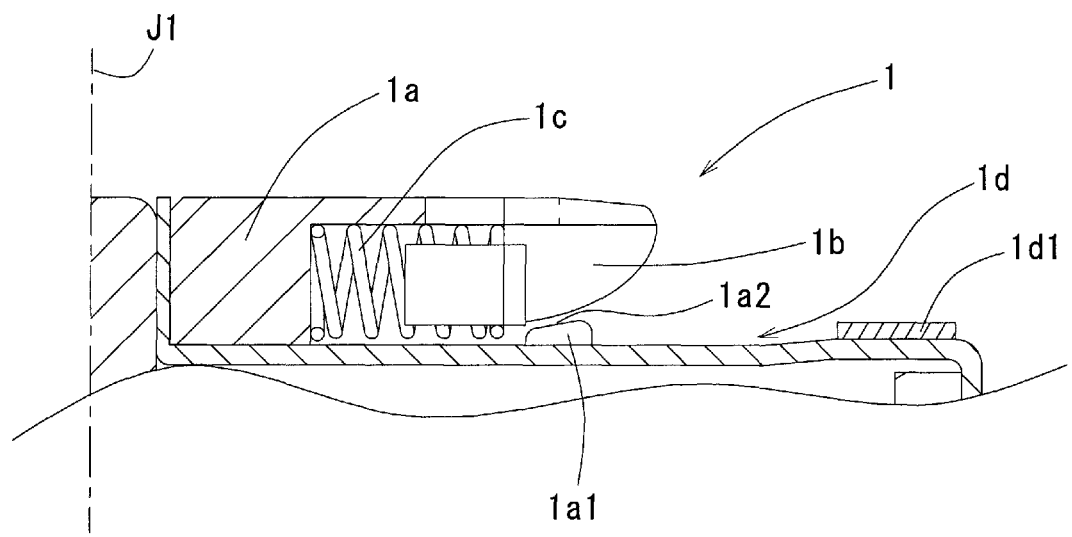
FIG. 11 is an enlarged schematic cross sectional view in the axial direction of a conventional claw structure.
Figure 12:
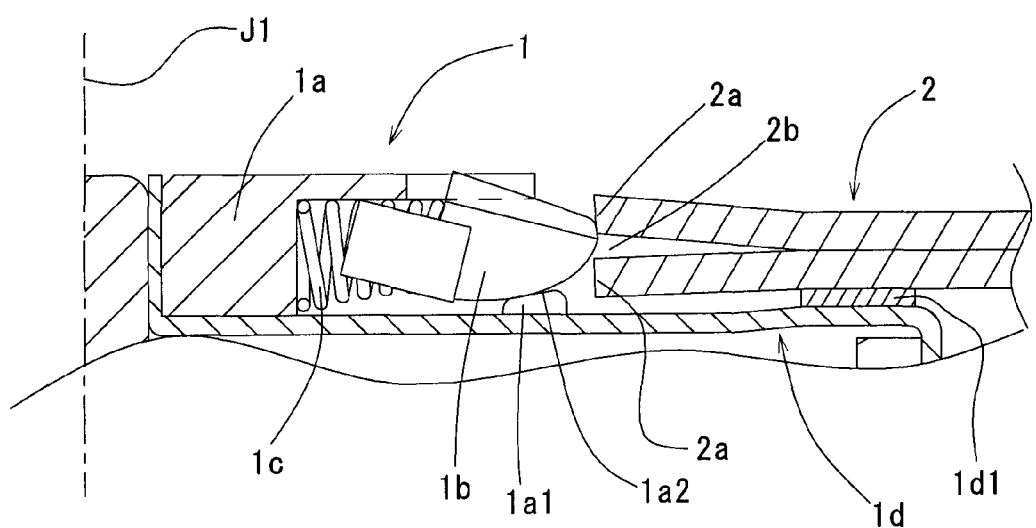
FIG. 12 is an enlarged schematic cross sectional view of the conventional claw structure in which a claw member thereof is at a radially inner position.

Hereinafter, a disk driving apparatus according to a preferred embodiment of the present invention will be described with reference to FIG. 10. FIG. 10 is a schematic cross sectional view in the axial direction of the disk driving apparatus according to the present preferred embodiment of the present invention.

According to FIG. 10, a disk driving apparatus 200 preferably includes a brushless motor 220 which rotates a discoid disk 210 including at a center portion thereof an opening 211 in a concentric manner with the brushless motor 220, a pickup mechanism 230 which emits an optical light at the disk 210 in order to store data on the disk 210 and to reproduce data from the disk 210, a gear mechanism 240 which moves the pickup mechanism 230 in the radial direction with respect to the disk 210, and a housing 250 for accommodating therein the brushless motor 220, the pickup mechanism 230 and the gear mechanism 240.

The gear mechanism 240 includes a motor 241, and a torque receiving gear 242 which receives a rotary torque generated by the motor 241.

The housing 250 includes a bordering plate 251 preferably made of a thin plate so as to divide the disk 210 and the gear mechanism 240. Also the housing 250 includes an opening 252 through which the disk 210 is inserted and rejected.

The pickup mechanism 230 preferably includes a storing/reproducing portion 231 which emits an optical light, and moving portion 232 which is arranged vertically with respect to the moves the storing/reproducing portion 231. The moving portion 232 preferably includes an engaging portion 232a which engages with the torque receiving portion 242. The storing/reproducing portion 231 is engaged with the moving portion 232 and is thereby allowed to move in the radial direction.

The torque receiving gear 242 rotates due to the engagement with a gear 241a which is attached to the motor 241. The moving portion 232 moves in the radial direction due to the engagement of torque receiving gear 242 with the engaging portion 232a.

While the present invention has been described in detail, the foregoing description is in all aspects illustrative and not restrictive. It is understood that numerous other modifications and variations can be devised without departing from the scope of the invention.

For example, although the preferred embodiments assume that the claw members 132 each include the disk retaining surface 132a2 and the sliding surface 132b2 that are separate from one another, the present invention is not limited thereto. The disk retaining surface 132a2 and the sliding surface 132b2 may be formed on a same surface integrally.

For example, although the preferred embodiments assume that the pair of sliding surfaces 132b2 are arranged on circumferential sides of each claw member 132, the present invention is not limited thereto. The sliding surface 132b2 may be arranged at a center of the disk retaining surface 132a2.

For example, although the preferred embodiments assume that the brushless motor according to the preferred embodiments include the rotor magnet 110 arranged opposed to the outer circumferential surface of the tooth portions 51b of the stator 50, the present invention is not limited thereto. The tooth portions 51b may extend toward the rotary axis J1, and the inner circumferential surface of the tooth portions 51b is opposed to the rotor holder 110. Also, the stator 50 and the rotor magnet 110 may be opposed to each other in the axial direction.

What is claimed is:

1. A chucking mechanism operable to detachably mount thereon a disk including an upper disk base, a lower disk base pasted with the upper disk base and a central opening portion, and rotate the disk in a concentric manner with a predetermined rotary axis, the chucking mechanism comprising:
   a center case arranged above a turn table, including a cylindrical portion which fits the central opening portion of the disk and a top plate covering an upper end of the cylindrical portion;
   an elastic member arranged radially inside the cylindrical portion; and
   a plurality of claw members receiving a radial force from the elastic member, radially projecting from the cylindrical portion, and supporting the central opening portion, each of the claw members comprising:
   a sliding surface; and
   a disk retaining surface separate from the sliding surface, the disk retaining surface being provided with a tip portion at a radially outmost area of each of the claw members; the sliding surface determining an axially lowest point of the tip portion, a first face extending from the sliding surface being below the tip portion;
   wherein the turn table includes a disk mounting portion on which the disk is mounted,
   wherein the tip portion moves, when the disk makes contact with the chucking mechanism, axially downwardly and radially inwardly, and
   wherein the tip portion is axially above a bottom surface of the upper disk base when the disk is mounted on the disk mounting portion,
   wherein an axial distance between the tip portion and a top surface of the disk mounting portion is, when the tip portion is at the axially lowest point, greater than at least approximately 1.08 mm.

2. The chucking mechanism according to claim 1, wherein a top surface of each of the claw members is, when the disk is not mounted on the chucking mechanism, at substantially the same position in the axial direction as the tip portion.

3. The chucking mechanism according to claim 1, wherein the center case includes a receiving portion having a top surface with which each of the claw members slides,
   the tip portion is, when the same is at the axially lowest point, at substantially the same position in the axial direction as the top surface of the receiving portion, or at a position above in the axial direction as the top surface of the receiving portion,
   a portion of the top surface of the receiving portion is, when the disk is retained by the chucking mechanism, axially above the bottom surface of the upper disk.

4. The chucking mechanism according to claim 3, wherein the disk retaining surface makes contact with the central opening portion, and the sliding surface is operable to slide with the top surface of the receiving portion, and the sliding surface is arranged axially above and radially inward of the disk retaining surface.

5. The chucking mechanism according to claim 4, wherein the disk retaining surface and the sliding surface each include an inclined surface having a predetermined angle, and an angle defined by the rotary axis and the disk retaining surface is greater than an angle defined by the rotary axis and the sliding surface.

6. The chucking mechanism according to claim 1, wherein the disk retaining surface makes contact with the central opening portion, a top surface of the turn table axially opposite from the disk retaining surface is substantially flat, and no component is arranged in an axial space between the disk retaining surface and the top surface of the turn table.

7. A brushless motor including the chucking mechanism according to claim 6, the brushless motor comprising:

a rotor portion including a rotor magnet rotating along with the chucking mechanism in the concentric manner with the rotary axis, and a stator portion including a stator arranged opposite to the rotor magnet, and rotatably supporting the rotor portion, wherein the turn table includes therein the rotor magnet.

8. A disk driving apparatus including the brushless motor according to claim 7, the disk driving apparatus comprising:

a pickup mechanism storing data on the disk and reproducing data from the disk, and a gear mechanism moving the pickup mechanism in a predetermined direction.

9. A brushless motor including the chucking mechanism according to claim 1, the brushless motor comprising:

a rotor portion including a rotor magnet rotating in the concentric manner with the rotary axis, and a stator portion including a stator arranged opposite to the rotor magnet, and rotatably supporting the rotor portion.

10. A disk driving apparatus including the brushless motor according to claim 9, the disk driving apparatus comprising:

a pickup mechanism storing data on the disk and reproducing data from the disk, and a gear mechanism moving the pickup mechanism in a predetermined direction.

11. A chucking mechanism operable to detachably mount thereon a discoid disk including an upper disk base, a lower disk base pasted with the upper disk base and a central opening portion, and rotate the disk in a concentric manner with a predetermined rotary axis, the chucking mechanism comprising:

a center case arranged above a turn table, including a cylindrical portion which fits the central opening portion of the disk and a top plate covering an upper end of the cylindrical portion;

an elastic member arranged radially inside the cylindrical portion; and a plurality of claw members receiving a radial force from the elastic member, radially projecting from the cylindrical portion, and supporting the central opening portion, each of the claw members comprising:

a sliding surface; and a disk retaining surface separate from the sliding surface, the disk retaining surface being provided with a tip portion at a radially outmost area of each of the claw members; the sliding surface making contact with a receiving portion to position the tip portion at an axially lowest point, a second face extending from the receiving portion being below the tip portion;

wherein the turn table includes a disk mounting portion on which the disk is mounted, wherein the tip portion moves, when the disk makes contact with the chucking mechanism, axially downwardly and radially inwardly, and wherein the tip portion is axially above a bottom surface of the upper disk base when the disk is mounted on the disk mounting portion, wherein an axial distance between the tip portion and a top surface of the disk mounting portion is, when the tip portion is at the axially lowest point, greater than at least approximately 1.08 mm.

* * * * *